United States Patent
Yang

(10) Patent No.: US 10,928,634 B2
(45) Date of Patent: Feb. 23, 2021

(54) EYEPIECE AND HEAD-MOUNTED DISPLAY DEVICE

(71) Applicant: GOERTEK TECHNOLOGY CO., LTD., Qingdao (CN)

(72) Inventor: Chun Yang, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 309 days.

(21) Appl. No.: 16/065,586

(22) PCT Filed: Dec. 18, 2017

(86) PCT No.: PCT/CN2017/117040
§ 371 (c)(1),
(2) Date: Jun. 22, 2018

(87) PCT Pub. No.: WO2019/080325
PCT Pub. Date: May 2, 2019

(65) Prior Publication Data
US 2019/0353905 A1 Nov. 21, 2019

(30) Foreign Application Priority Data
Oct. 24, 2017 (CN) .......................... 201711003312.8

(51) Int. Cl.
*G02B 3/02* (2006.01)
*G02B 27/01* (2006.01)
(Continued)

(52) U.S. Cl.
CPC .......... *G02B 27/0172* (2013.01); *G02B 3/08* (2013.01); *G02B 13/16* (2013.01); *G02B 27/0176* (2013.01); *G02B 2027/0152* (2013.01)

(58) Field of Classification Search
CPC ............................................... G02B 27/0172
(Continued)

(56) References Cited

U.S. PATENT DOCUMENTS

| 2016/0115562 A1 | 4/2016 | Santacreu et al. |
| 2018/0088313 A1* | 3/2018 | Jhang .................. G02B 9/10 |
| 2018/0088314 A1 | 3/2018 | Jhang et al. |

FOREIGN PATENT DOCUMENTS

| CN | 104614851 A | 5/2015 |
| CN | 204964882 U | 1/2016 |

(Continued)

OTHER PUBLICATIONS

KR Office Action in application No. 10-2018-70168869 dated Dec. 4, 2019.
(Continued)

*Primary Examiner* — James C. Jones
(74) *Attorney, Agent, or Firm* — Maschoff Brennan

(57) ABSTRACT

Provided are an eyepiece and a head-mounted display device, where the eyepiece includes: a positive lens and a negative lens arranged sequentially and coaxially; where a light incident surface of the positive lens is a planar Fresnel surface, and a light emergent surface of the positive lens is a convex surface; a light incident surface of the negative lens is a concave surface, and a light emergent surface of the negative lens is a convex surface; and the light to be observed is incident on the light incident surface of the negative lens and refracted by the negative lens to the light incident surface of the positive lens, and enters human eyes after being refracted by the positive lens. The eyepiece and head-mounted display device provided by the present disclosure realize an ultrathin eyepiece optical system and facilitate a miniaturized and lighter head-mounted display device.

18 Claims, 4 Drawing Sheets

(51) Int. Cl.
*G02B 3/08* (2006.01)
*G02B 13/16* (2006.01)

(58) Field of Classification Search
USPC .......................................................... 359/717
See application file for complete search history.

(56) References Cited

FOREIGN PATENT DOCUMENTS

| CN | 106019596 A | 10/2016 |
|---|---|---|
| CN | 106291940 A | 1/2017 |
| CN | 106501943 A | 3/2017 |
| CN | 106526851 A | 3/2017 |
| CN | 106526852 A | 3/2017 |
| CN | 206209198 U | 5/2017 |
| WO | 2016/115562 A1 | 7/2016 |

OTHER PUBLICATIONS

CN Office Action in application No. 2018-531461 dated Nov. 26, 2019.
KR Office Action dated Jun. 10, 2019 as received in Application No. 10-2018-7016869.

\* cited by examiner

EYEPIECE AND HEAD-MOUNTED DISPLAY DEVICE

CROSS REFERENCE TO RELATED APPLICATIONS

This application makes reference to Chinese Patent Application No. 201711003312.8 filed on Oct. 24, 2017 and entitled "Eyepiece and Head-mounted Display Device", which is hereby incorporated by reference in its entirety.

TECHNICAL FIELD

The present disclosure relates to the technical field of virtual reality, and particularly to an eyepiece and a head-mounted display device.

BACKGROUND

VR (Virtual Reality) technology is a computer simulation system that can create and experience a virtual world. It uses a computer to generate a simulation environment, and enables users to immerse in the simulation environment by interactive three-dimensional dynamic visualization with multi-source information fusion and system simulation with the behavior of an entity. With the development of technology, VR head-mounted display devices have been widely used in various fields, such as games, real estates, tourism and the like.

SUMMARY

There is provided in the present disclosure an eyepiece, including: a positive lens and a negative lens arranged sequentially and coaxially;

where a light incident surface of the positive lens is a planar Fresnel surface, and a light emergent surface of the positive lens is a convex surface; the light incident surface of the negative lens is a concave surface, and the light emergent surface of the negative lens is a convex surface; and the light to be observed is incident on the light incident surface of the negative lens, and is refracted by the negative lens to the light incident surface of the positive lens and emitted by the positive lens.

DETAILED DESCRIPTION

To make the principles and advantages of the present disclosure more apparent, the technical solutions of the present disclosure will be described more clearly and fully hereinafter with reference to specific embodiments and corresponding drawings of the present disclosure. Obviously, the described embodiments are only a part of the embodiments of the present disclosure, rather than all of the embodiments. All other embodiments obtained by persons of ordinary skill in the art based on the embodiments of the present disclosure without creative efforts shall fall within the protection scope of the present disclosure.

Figure 1A:
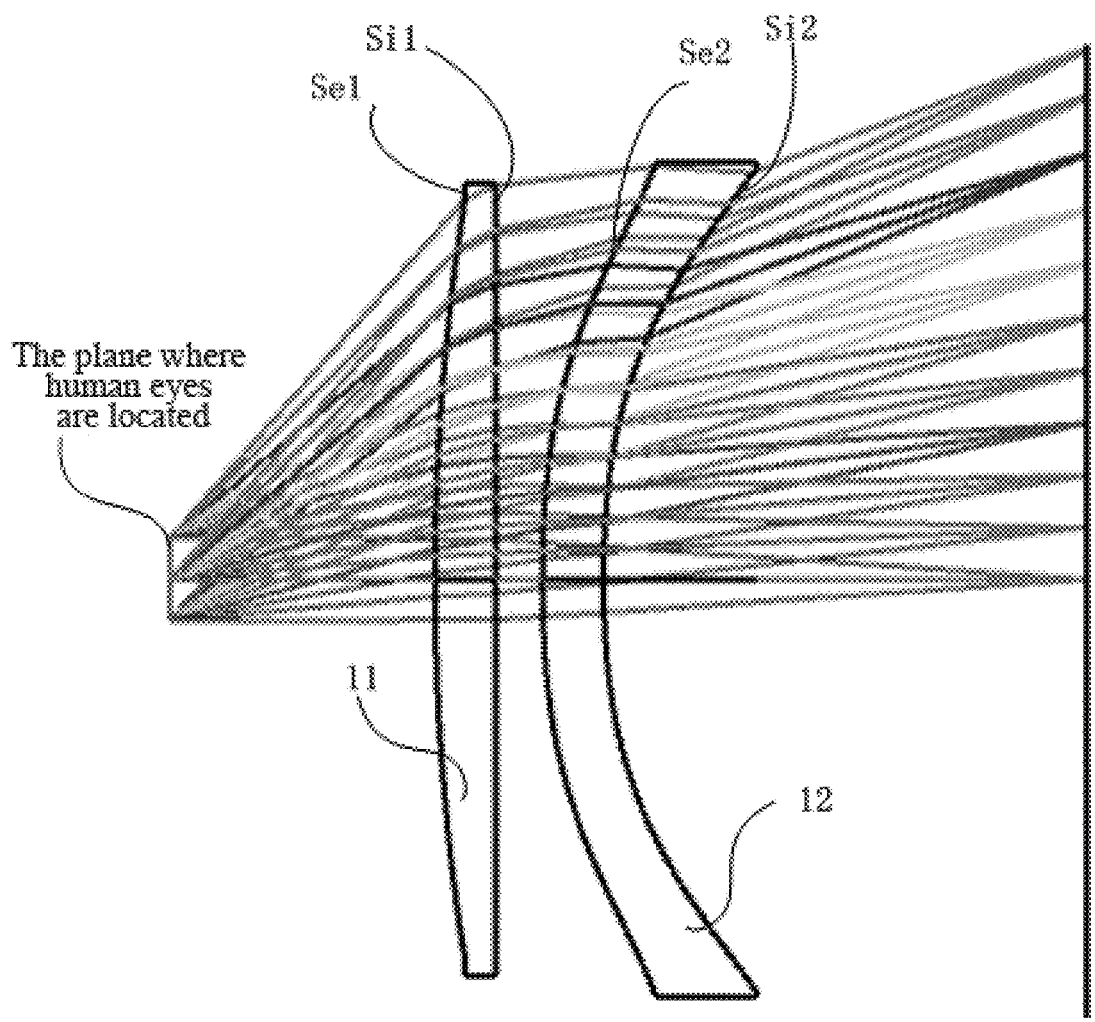
FIG. 1A is a schematic diagram of a structure of an eyepiece according to an embodiment of the present disclosure.

FIG. 1A is a schematic diagram of a structure of an eyepiece according to an embodiment of the present disclosure. As shown in FIG. 1A, an optical system of the eyepiece includes:

a positive lens 11 and a negative lens 12 arranged sequentially and coaxially, a light incident surface Si1 of the positive lens 11 being close to the light emergent surface Se2 of the negative lens.

Herein, a light incident surface Si2 of the negative lens 12 is a concave surface, and a light emergent surface Se2 is a convex surface. When the light to be observed is incident, the concave surface of Si2 can ensure that the negative lens 12 has higher light collection efficiency and can receive and transmit the light to be observed as much as possible. Se2 is a convex surface, which can refract light with large angle and enables light with larger divergence angle to be incident on the light incident surface Si1 of the positive lens 11 with a larger incident height and a smaller divergence angle. Furthermore, the marginal lights and the principal lights incident on Si1 have a larger opening angle and a lower incident height of the rays with respect to the human eyes, thereby achieving the purpose of increasing the field angle.

Herein, the light incident surface Si1 of the positive lens 11 is a planar Fresnel surface, and the light emergent surface Se1 is a convex surface. When light is incident on Si1, Si1 may collect light incident thereon and reshape the light to make it reach Se1 at a required angle. Se1 is a convex surface, which can refract light with a large angle and further increase the field angle.

Optionally, Se1 can be designed as a convex aspheric surface. The curvature radius of the convex aspheric surface undergoes a specific change from the center to the edge continuously, and the direction of each emergent light can be accurately controlled so that the emergent light is emitted to the human eyes at a set angle to perform aberration correction while increasing the field angle.

In some embodiments, after determining the requirements for aberration correction and the deflection degree of the light, a reverse design may be performed to obtain a convex aspheric surface Se1 with a varying curvature radius. In an alternative embodiment, in order to ensure the convenience of processing and detection, the surface shape of Se1 can be designed as an even aspheric surface. The surface shape of Se1 can be designed according to the equation for the even aspheric surface shown below:

$$z = \frac{cr^2}{1+\sqrt{1-(1+k)c^2r^2}} + \sum_{i=2}^{N} a_i r^{2i}$$

Herein, z represents a coordinate along the direction of the optical axis, and r represents a radial coordinate along the height direction of the lens; c is a quadratic coefficient related to the curvature of the center point of the aspheric surface, $c=1/r0$, and $r0$ is the curvature radius of the center point of the aspheric surface; k is a conic coefficient, and $k=-e^2$; and $a_i$ is coefficients of each even-order term. Optionally, in the practical design of the present embodiment, $N=3$ may be selected, that is, the even-order term may be up to the sixth power.

In some embodiments, the surface shape of Se1 may also be designed as an odd-order aspheric surface. The surface shape of Se1 can be designed based on the odd-order aspheric surface equation, as shown below:

$$z = \frac{cr^2}{1+\sqrt{1-(1+k)c^2r^2}} + \sum_{i=1}^{N} \beta_i r^i$$

Herein, $\beta_i$ is a coefficient of each odd-order term.

In an optional embodiment, when the positive lens 11 and the negative lens 12 are processed, a plastic material may be selected. Plastic materials are easy to process and lay a foundation for the light weighting of the eyepiece optical system. Herein, the refractive index n1 and the dispersion v1 of the positive lens 11 can satisfy the following conditions: 1.5<n1<1.55, 55<v1<60; the refractive index n2 and the dispersion v2 of the negative lens 12 can satisfy the following conditions: 1.5<n2<1.55, 55<v2<60. Optionally, in the actual processing, positive and negative lenses processed by K26R type plastic materials can be selected in the some embodiments. The K26R type plastic materials have a refractive index of 1.535 and a dispersion of 55.6.

The eyepiece provided in the present embodiment is composed of positive and negative lenses with simple structures. Herein, the light emergent surface of the positive lens is a convex surface, and the light incident surface is a planar Fresnel surface; the light incident surface of the negative lens is a concave surface, and the light emergent surface is a convex surface. In the case of ensuring good optical performance of the positive and negative lenses, such an eyepiece arrangement greatly reduces the thickness of the lenses, realizes an ultrathin eyepiece optical system and facilitates a miniaturized and lighter head-mounted display device. Secondly, the light emergent surface of the positive lens 11 is a convex aspheric surface, which corrects the aberration of the overall eyepiece optical system to a certain extent, so that the eyepiece has an excellent imaging quality and clear images. In addition, the eyepiece composed of positive and negative lenses can correct the chromatic aberration of the overall optical system of the eyepiece, improve the imaging quality, and has the advantages of simple structure and low cost.

Figure 1B:
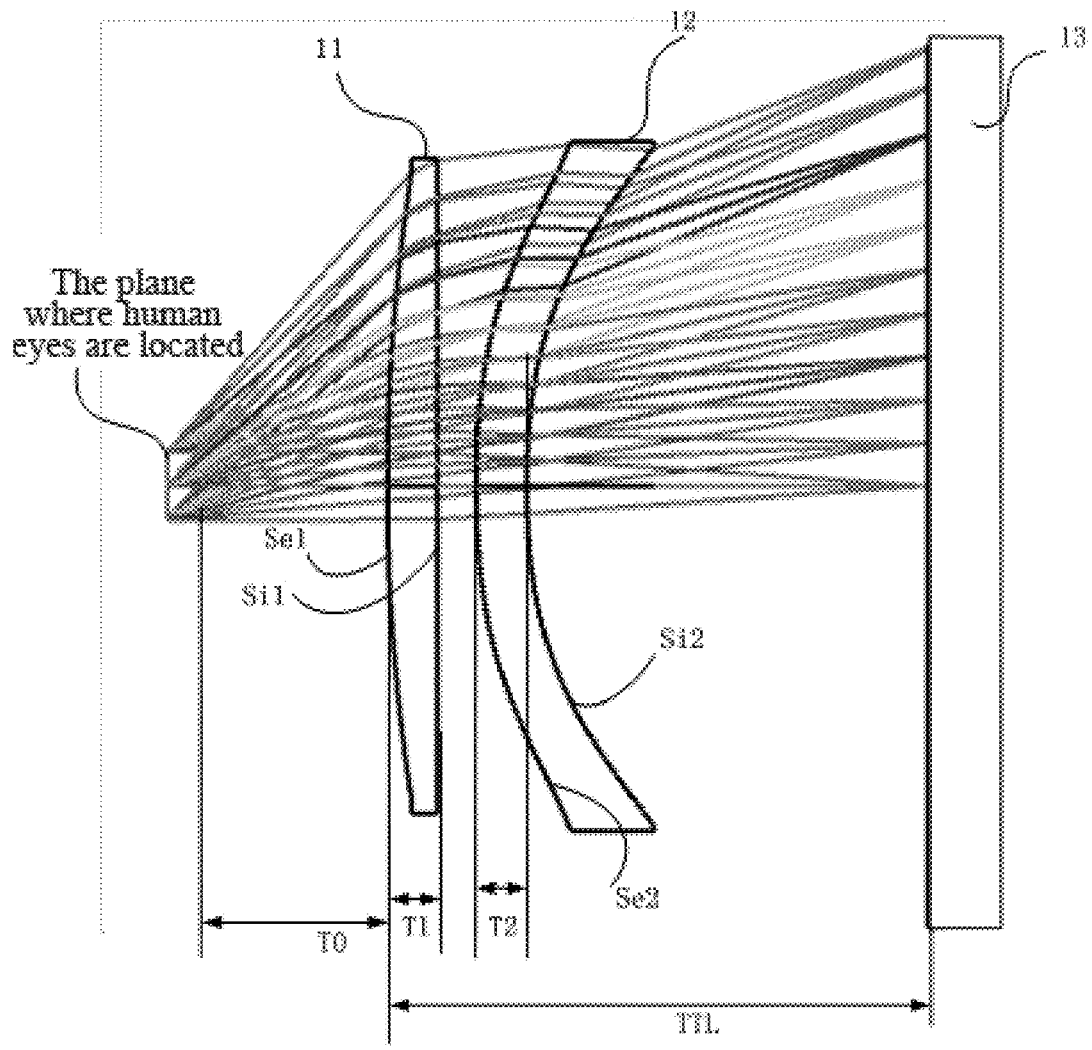
FIG. 1B is a schematic diagram of a structure of a head-mounted display device according to an embodiment of the present disclosure.

FIG. 1B is a schematic diagram of a structure of a head-mounted display device according to an embodiment of the present disclosure. As shown in FIG. 1B, the head-mounted display device includes:

a positive lens 11 and a negative lens 12 arranged sequentially and coaxially, and a display device 13. Herein, the light incident surface Si1 of the positive lens 11 is close to the light emergent surface Se2 of the negative lens, and the light incident surface Si2 of the negative lens is close to the display device 13.

Optionally, in the present embodiment, the display device 13 may be a display device with a larger size, such as a display device of a mobile phone or an LCD (Liquid Crystal Display), etc.

As shown in FIG. 1B, a distance from the center point of the display screen of the display device 13 to the center point of the light emergent surface Se1 of the positive lens 11 is defined as TTL (total track length). In the head-mounted display device provided in the present embodiment, since the positive lens 11 and the negative lens 12 have a strong refractive power and a thinner volume, TTL can reach 32 mm or less. Compared with the existing head-mounted display device with a large display screen, the smaller TTL in the present embodiment greatly reduces the volume of the head-mounted display device.

As shown in FIG. 1B, after the user wears the head-mounted display device provided in the present embodiment, the position of the human eyes is the exit pupil position of the eyepiece optical system. A distance from the center point of the light emergent surface Se1 of the positive lens 11 to the human eyes is defined as T0. In order to ensure that the user can watch a better image after wearing the head-mounted display device, the length of T0 can be set to satisfy the following condition: 0.35 TTL<T0<0.45 TTL. Optionally, the length of T0 may be controlled by providing an adjustable support component on the head-mounted display device in consideration of different head shapes of different users.

In some embodiments, in order to ensure that the two lenses in the eyepiece have a thinner thickness and a better optical performance, the center thickness T1 of the positive lens 11 can be designed to satisfy the following condition: 0.09 TTL<T1<0.1 TTL; the center thickness T2 of the negative lens 12 satisfies the following condition: 0.09 TTL<T2<0.1 TTL; and the focal length F of the device satisfies the following condition: 0.9 TTL<F<0.95 TTL. Optionally, the Fresnel curvature radius R of the light incident surface Si1 of the positive lens 11 can be designed to satisfy the following condition: −0.6 F<R<−0.65 F; the focal length F1 of the positive lens 11 satisfies the following condition: F1<F, and the focal length F2 of the negative lens 12 satisfies the following condition: −700<F2<0. For example, after iterative optimization, when the pixel size of the display chip of the display device 13 is 39 um, it can be selected that F=29.24 mm, F1=28.78 mm, and F2=−677.6 mm.

In some embodiments, the above-mentioned structure and parameter design can make the half field angle θ of the eyepiece optical system reach about 98°, that is, tan θ is between 1.1 and 1.2. In addition, when the user wears the head-mounted display device to watch the virtual scene, the wearing pressure is small, and a deep sense of immersion and realism can be generated.

In the present embodiment, the eyepiece-fitted display device can achieve a shorter axial distance and a field angle of about 98°, which is smaller and lighter while ensuring that the head-mounted display device has a field angle which is large enough.

In the following section, a specific example will be provided to explain in detail the optical system of the head-mounted display device provided by the embodiment of the present disclosure with reference to Tables 1 and 2. A possible design result is shown in Table 1. In Table 1, Surface represents the optical surface numbered sequentially from the human eyes to the display device, Type represents the surface shape of each optical surface, C represents the curvature of each optical surface, T represents the distance between each optical surface and the subsequent optical surface, Glass represents the material of each optical surface, Semi-Diameter represents the aperture of each optical surface, and Conic represents the quadric surface constant.

TABLE 1

| Surface | Type | C | T | Glass | Semi-Diameter | Conic |
|---|---|---|---|---|---|---|
| 1 | Plane | | 13.000 | | 2.00 | 0.00E+00 |
| 2 | Aspheric surface | 118.402 | 3.000 | K26R_25 | 18.79 | 0.00E+00 |
| 3 | Fresnel surface | −17.642 | 2.26 | | 19.48 | −9.85E−01 |
| 4 | Aspheric surface | 53.788 | 3.000 | K26R_25 | 20.45 | −1.11E−01 |
| 5 | Aspheric surface | 45.955 | 23.74 | | 20.19 | 2.30E+00 |
| 6 | Plane | | 0.000 | | 26.23 | 0.00E+00 |

In Table 1, Surface1 is the plane where the human eyes are located, Surface2 is the light emergent surface Se1 of the positive lens 11, Surface3 is the light incident surface Si1 of the positive lens 11, Surface 4 is the light emergent surface Se2 of the negative lens 12, Surface 5 is the light incident surface Si2 of the negative lens 12, and Surface 6 is the display screen of the display device 13.

As shown in Table 1, in a possible design, a thickness of the positive lens 11 is 3 mm, a distance from the center point of the light emergent surface Se1 of the positive lens 11 to the human eyes is 13 mm, the curvature radius of the center point of Se1 is 118.402 mm, and the Fresnel curvature radius of Si1 is −17.642. A thickness of the negative lens 12 is 3 mm, a curvature radius of the center point of the light emergent surface Se2 of the negative lens 12 is 53.788 mm, a distance between the center points of Se2 and Si1 is 2.272 mm, and a curvature radius of the center point of the light incident surface Si2 is 45.955 mm. A distance between Si2 and the display screen of the display device 13 is 23.748 mm, and a thickness of the display device is 26.23 mm.

In such a design, the TTL of the optical system is calculated as follows: TTL=3+2.26+3+23.74=32 mm, and the axial length is greatly reduced with respect to the prior art.

In this design, the even-order aspheric coefficients $\alpha 2$, $\alpha 3$ and $\alpha 4$ can be as shown in the following table:

TABLE 2

| Surface | $\alpha_2$ | $\alpha_3$ |
|---|---|---|
| 1 | 0.00E+00 | 0.00E+00 |
| 2 | 0.00E+00 | 0.00E+00 |
| 3 | −3.70E−06 | −3.73E−09 |
| 4 | 2.92E−05 | −4.83E−08 |
| 5 | 3.59E−05 | −5.87E−08 |
| 6 | 0.00E+00 | 0.00E+00 |
| 7 | 0.00E+00 | 0.00E+00 |
| 8 | 0.00E+00 | 0.00E+00 |

Based on the above design, the imaging quality of the designed optical system can be analyzed by drawing MTF (Modulation Transfer Function) curves, optical field curvature, distortion graphs, spot diagrams and the chromatic aberration graphs.

Figure 2A:
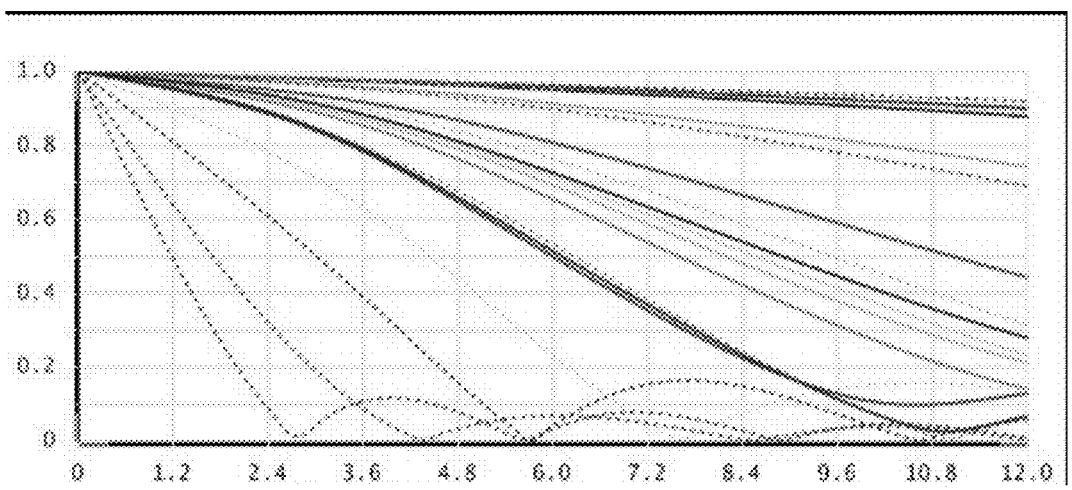
FIG. 2A is a schematic diagram of MTF curves of a head-mounted display device at a limit resolution of a display device according to an embodiment of the present disclosure.
Figure 2B:
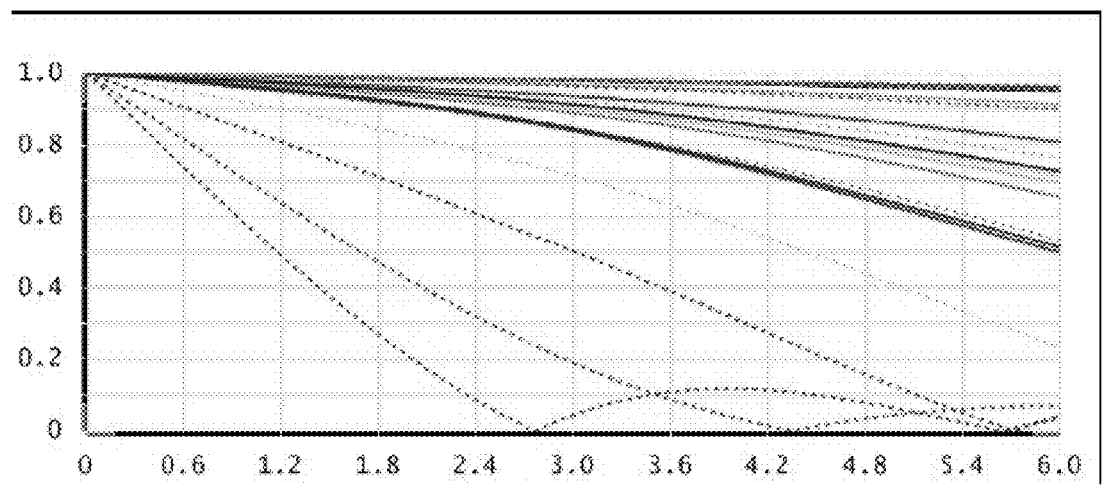
FIG. 2B is a schematic diagram of MTF curves of a head-mounted display device at a ½ limit resolution of a display device according to an embodiment of the present disclosure.

FIG. 2A is a schematic diagram of MTF curves of an eyepiece optical system provided in an embodiment of the present disclosure at a limit resolution of the display device, and FIG. 2B is a schematic diagram of MTF curves at a ½ limit resolution of a display device. In FIGS. 2A and 2B, each color represents each of the field lights, the horizontal coordinate represents a distance from the point on the optical system to the center of the optical system, and the vertical axis represents a percentage of the imaging quality close to the object. The MTF can comprehensively reflect the imaging quality of the optical system, the smoother the shape of the curve thereof, and the higher the height relative to the axis X (i.e. closer to 1), the better the imaging quality of the optical system. In FIGS. 2A and 2B, the curves in various colors are relatively smooth and compact, and the MTF values represented by the curves are high. In FIG. 2B, in the case of a half of the limit resolution of a display device, the MTF within 0.6 field of view has reached 0.4 or more, indicating that the aberration of the optical system has been well corrected.

Figure 3:
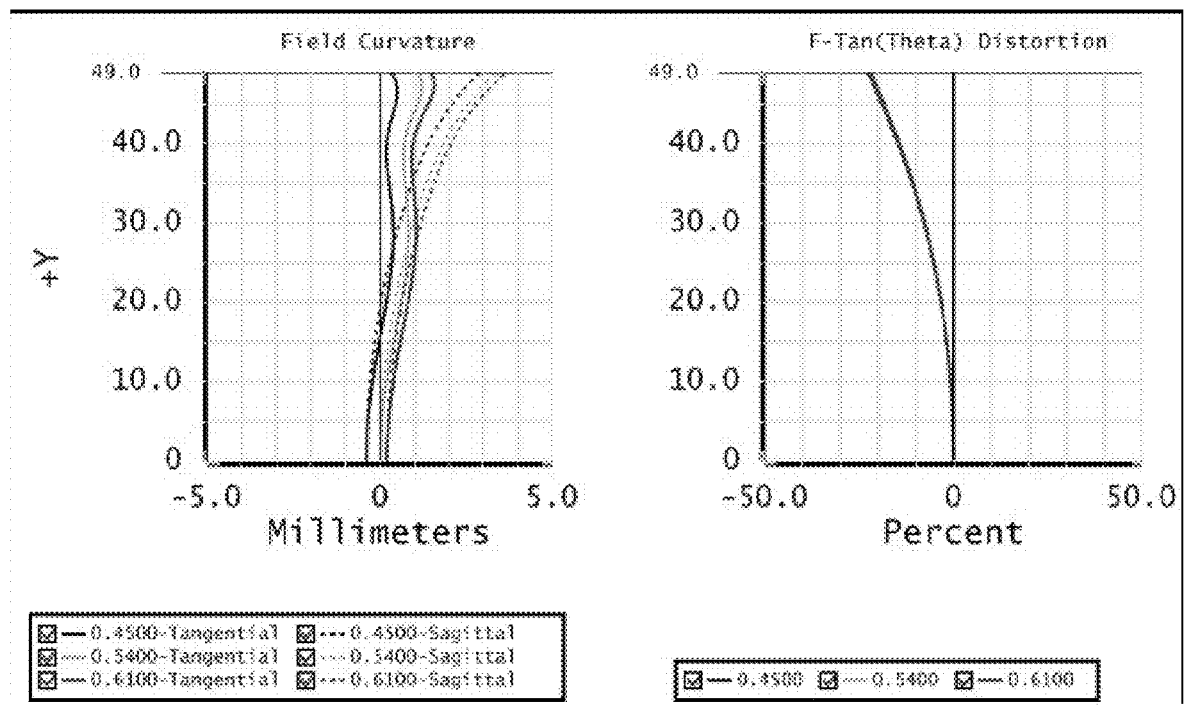
FIG. 3 is a schematic diagram of an optical field curvature and a distortion of a head-mounted display device according to an embodiment of the present disclosure.

FIG. 3 is a schematic diagram of an optical field curvature and a distortion of an eyepiece optical system provided by an embodiment of the present disclosure. The left diagram of FIG. 3 shows a field curvature, in which different colors represent different wavelengths, a solid line represents a tangential field curvature, and a dashed line represents a sagittal field curvature, and the astigmatism of the optical system can be obtained by the subtraction of the above two field curvatures. The astigmatism and field curvature are important aberrations affecting off-axis field lights. An excessively large astigmatism may greatly affect the imaging quality of off-axis lights of the system, and the field curvature may lead to the situation that central and edge optimal imaging are not on the same plane. As can be seen from the left diagram of FIG. 3, the field curvature and astigmatism of the optical system provided in the present embodiment are corrected within 5 mm. As can be seen from the right diagram of FIG. 3, the distortion (F-Tan(theta) distortion) of the optical system provided in the present embodiment is less than 25%.

Figure 4:
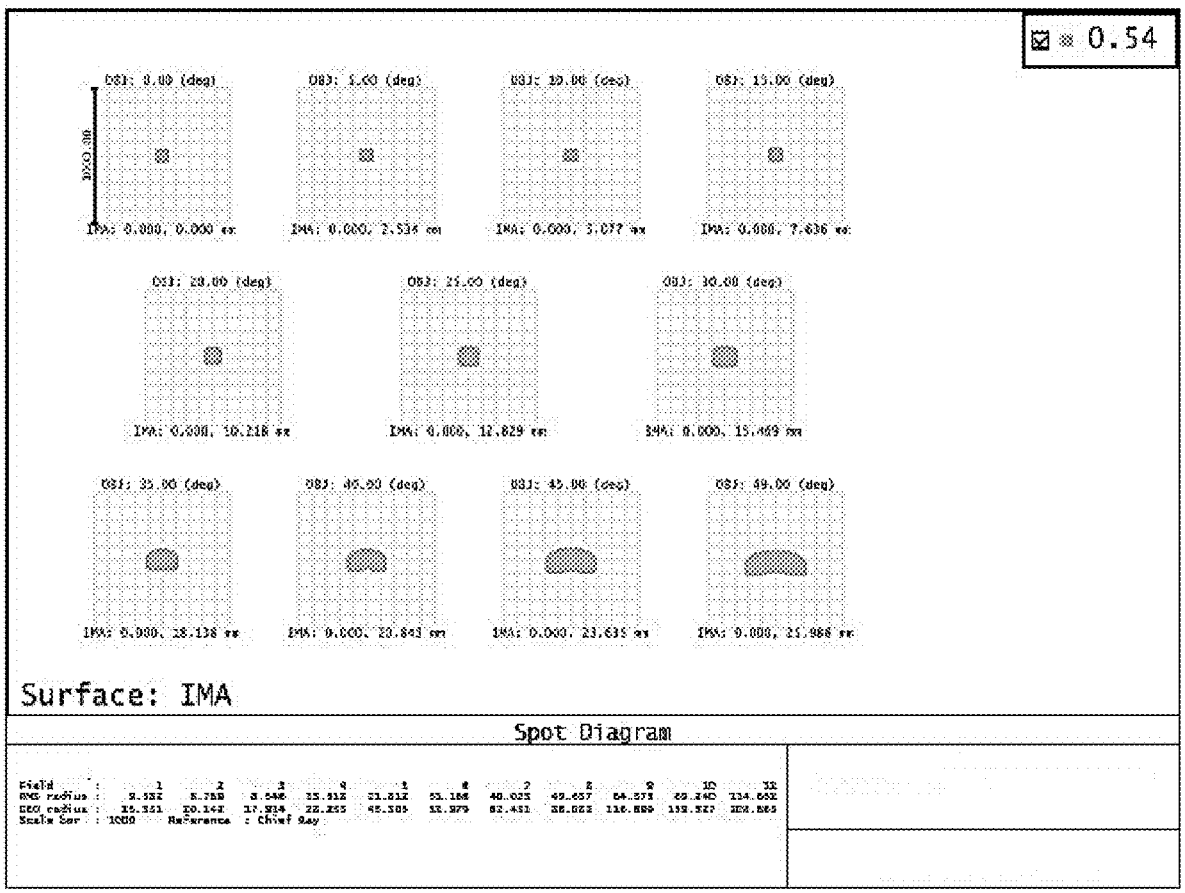
FIG. 4 is a spot diagram of a head-mounted display device according to an embodiment of the present disclosure.

FIG. 4 is a spot diagram of an eyepiece optical system according to an embodiment of the present disclosure. The spot diagram shows the dispersion light spots formed by various field lights of the optical system that converge on the image plane. A smaller RMS (Root Mean Square) radius of the spot diagram demonstrates a better imaging quality of the system. As can be seen from FIG. 4, the RMS diameter of the diffuse spot of the optical system provided in the present embodiment is less than 120 um, which indicates that the aberration correction has been corrected very well.

Figure 5:
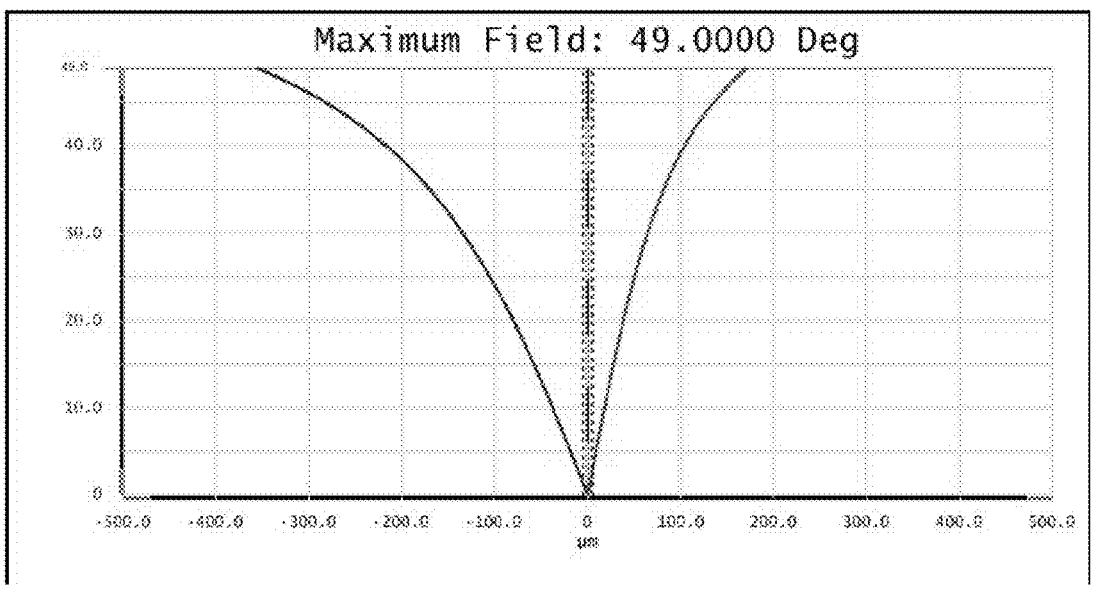
FIG. 5 is a schematic diagram of a system chromatic aberration curve of a head-mounted display device according to an embodiment of the present disclosure.

FIG. 5 is a schematic diagram of a system chromatic aberration curve of an eyepiece optical system according to an embodiment of the present disclosure. In FIG. 5, the horizontal axis represents the chromatic aberration, and the vertical axis represents the field angle. The deviation of the curve from the vertical axis indicates the change in chromatic aberration, and a greater deviation means a larger chromatic aberration. In FIG. 5, the maximum half field angle is 49°, and the chromatic aberration can be controlled within 350 um.

It should be noted that the descriptions of "first" and "second" herein are used to distinguish different messages, devices, modules, etc., and do not represent the sequential order and not define that "first" and "second" are different types.

It should also be noted that the terms "including", "comprising" or any other variations thereof are intended to cover non-exclusive inclusions, so as to make processes, methods, goods or devices which include a series of elements to include not only the series of elements but also other elements that are not explicitly listed, or other elements that are inherent to such processes, methods, goods or devices. In the case of no more limitation, the element defined by the sentence "including a . . . " does not exclude a case that there are additional identical elements in the processes, methods, goods or devices which include the elements.

The above descriptions are merely some embodiments of the present disclosure and are not intended to limit the present disclosure. It will be apparent to those skilled in the art that various modifications and variations can be made in the present disclosure. Any modification, equivalent substitution or improvement, etc. within the spirit and principle of the present disclosure shall be included in the scope of claims of the present disclosure.

The invention claimed is:

1. An eyepiece, comprising:
a positive lens and a negative lens arranged sequentially and coaxially, wherein:
a light incident surface of the positive lens is a planar Fresnel surface, and a light emergent surface of the positive lens is a convex surface;
a light incident surface of the negative lens is a concave surface, and a light emergent surface of the negative lens is a convex surface; and
light to be observed is incident on the light incident surface of the negative lens, and is refracted by the negative lens to the light incident surface of the positive lens, and emitted by the positive lens.

2. The eyepiece of claim 1, wherein the light emergent surface of the positive lens is a convex aspheric surface.

3. The eyepiece of claim 1, wherein:
a refractive index n1 and a dispersion v1 of the positive lens satisfy a condition of $1.5<n1<1.55$, and $55<v1<60$; and
a refractive index n2 and a dispersion v2 of the negative lens satisfy a condition of $1.5<n2<1.55$, and $55<v2<60$.

4. A head-mounted display device, comprising:
an eyepiece; and
a display device coaxial with the eyepiece, wherein:
the eyepiece comprises a positive lens and a negative lens arranged sequentially and coaxially;
a light incident surface of the positive lens is a planar Fresnel surface, and a light emergent surface of the positive lens is a convex surface, a light incident surface of the negative lens is a concave surface, and a light emergent surface of the negative lens is a convex surface;
light to be observed is incident on the light incident surface of the negative lens, and is refracted by the negative lens to the light incident surface of the positive lens, and emitted by the positive lens; and
screen light emitted by the display device enters human eyes after being refracted by the eyepiece.

5. The device of claim 4, wherein a distance TTL from a center point of the light emergent surface of the positive lens to a center point of a display screen of the display device is less than 32 mm.

6. The device of claim 5, wherein:
a distance TO from a center point of the positive lens to human eyes satisfies a condition of $0.35\ TTL<T0<0.45\ TTL$; and
a center thickness T1 of the positive lens satisfies a condition of $0.09\ TTL<T1<0.1\ TTL$.

7. The device of claim 5, wherein a center thickness T2 of the negative lens satisfies a condition of $0.09\ TTL<T2<0.1\ TTL$.

8. The device of claim 5, wherein a focal length F of the device satisfies a condition of $0.9\ TTL<F<0.95\ TTL$.

9. The device of claim 8, wherein a Fresnel curvature radius R of the light incident surface of the positive lens satisfies a condition of $-0.6\ F<R<-0.65\ F$.

10. The device of claim 8, wherein a focal length of the negative lens satisfies a condition of $-700<F2<0$; and the focal length F1 of the positive lens is less than F.

11. The eyepiece of claim 2, wherein:
a refractive index n1 and a dispersion v1 of the positive lens satisfy a condition of $1.5<n1<1.55$, and $55<v1<60$; and
a refractive index n2 and a dispersion v2 of the negative lens satisfy a condition of $1.5<n2<1.55$, and $55<v2<60$.

12. A head-mounted display device, comprising:
an eyepiece;
and a display device coaxial with the eyepiece, wherein:
the eyepiece comprises a positive lens and a negative lens arranged sequentially and coaxially;
a light incident surface of the positive lens is a planar Fresnel surface, and a light emergent surface of the positive lens is a convex surface; a light incident surface of the negative lens is a concave surface, and a light emergent surface of the negative lens is a convex surface;
light to be observed is incident on the light incident surface of the negative lens, and is refracted by the negative lens to the light incident surface of the positive lens, and emitted by the positive lens;
screen light emitted by the display device enters human eyes after being refracted by the eyepiece; and
the light emergent surface of the positive lens is a convex aspheric surface.

13. The device of claim 12, wherein a distance TTL from a center point of the light emergent surface of the positive lens to a center point of a display screen of the display device is less than 32 mm.

14. The device of claim 13, wherein:
a distance TO from a center point of the positive lens to human eyes satisfies a condition of $0.35\ TTL<T0<0.45\ TTL$; and
a center thickness T1 of the positive lens satisfies a condition of $0.09\ TTL<T1<0.1\ TTL$.

15. The device of claim 13, wherein a center thickness T2 of the negative lens satisfies a condition of $0.09\ TTL<T2<0.1\ TTL$.

16. The device of claim 13, wherein a focal length F of the device satisfies a condition of $0.9\ TTL<F<0.95\ TTL$.

17. The device of claim 16, wherein a Fresnel curvature radius R of the light incident surface of the positive lens satisfies a condition of $-0.6\ F<R<-0.65\ F$.

18. The device of claim 16, wherein a focal length of the negative lens satisfies a condition of $-700<F2<0$; and the focal length F1 of the positive lens is less than F.

* * * * *